United States Patent [19]

Smick et al.

[11] Patent Number: 5,368,878
[45] Date of Patent: Nov. 29, 1994

[54] REDUCED FAT MEAT PRODUCTS

[75] Inventors: Cathysue Smick; Robert V. Schanefelt, both of Decatur, Ill.

[73] Assignee: A. E. Staley Manufacturing Company, Decatur, Ill.

[21] Appl. No.: 90,570

[22] Filed: Jul. 6, 1993

Related U.S. Application Data

[63] Continuation of Ser. No. 896,096, Jun. 10, 1992, abandoned, which is a continuation-in-part of Ser. No. 578,994, Sep. 6, 1990, abandoned, which is a continuation-in-part of Ser. No. 483,208, Feb. 20, 1990, abandoned.

[51] Int. Cl.$^5$ ............................................. A23L 1/317
[52] U.S. Cl. ................................... 426/646; 426/661; 426/802; 426/804
[58] Field of Search ............... 426/646, 652, 574, 578, 426/661, 802, 804; 127/32, 33, 38, 39, 40

[56] References Cited

U.S. PATENT DOCUMENTS

| | | |
|---|---|---|
| 675,822 | 6/1901 | Duryea . |
| 696,949 | 4/1902 | Duryea . |
| 2,068,051 | 1/1937 | Canton ........................... 426/578 |
| 2,131,064 | 9/1938 | Musher ........................... 426/633 |
| 2,503,053 | 4/1950 | Kerr ............................... 127/38 |
| 2,791,508 | 5/1957 | Rivoche ........................... 426/573 |
| 2,805,995 | 9/1957 | Adelson ........................... 252/33.6 |
| 2,978,446 | 4/1961 | Battista et al. ................... 260/212 |
| 3,023,104 | 2/1962 | Battista . |
| 3,067,067 | 12/1962 | Etheridge ........................ 127/71 |
| 3,093,486 | 6/1963 | Krett et al. . |
| 3,133,836 | 5/1964 | Winfrey ........................... 127/71 |
| 3,197,337 | 7/1965 | Schink ............................ 127/28 |
| 3,219,483 | 11/1965 | Goos .............................. 127/28 |
| 3,351,489 | 11/1967 | Battista .......................... 127/32 |
| 3,532,602 | 10/1970 | Seidman . |
| 3,556,942 | 1/1971 | Hathaway . |
| 3,582,359 | 6/1971 | Horn .............................. 426/573 |
| 3,586,536 | 6/1971 | Germino et al. ................... 127/32 |
| 3,600,186 | 8/1971 | Mattson . |
| 3,666,557 | 5/1972 | Jensen et al. ..................... 127/32 |
| 3,671,269 | 6/1972 | Germino . |
| 3,705,811 | 12/1972 | Yoshida et al. . |
| 3,717,475 | 2/1973 | Germino et al. . |
| 3,730,840 | 5/1973 | Sugimoto et al. . |
| 3,830,697 | 8/1974 | Yoshida . |
| 3,879,212 | 4/1975 | Yoshida ........................... 106/213 |
| 3,881,991 | 5/1975 | Kurimoto . |
| 3,883,365 | 5/1975 | Forsberg ......................... 127/60 |
| 3,928,062 | 12/1975 | Yamauchi ......................... 127/60 |
| 3,962,465 | 6/1976 | Richter et al. .................... 426/48 |
| 3,986,890 | 10/1976 | Richter et al. .................... 127/38 |
| 4,009,291 | 2/1977 | Mitchell et al. ................... 426/548 |
| 4,069,157 | 1/1978 | Hoover et al. ..................... 210/433 M |
| 4,143,163 | 3/1979 | Hutchison ........................ 426/96 |
| 4,143,174 | 3/1979 | Shah .............................. 426/570 |
| 4,192,900 | 3/1980 | Cheng ............................. 426/578 |
| 4,199,374 | 4/1980 | Dwivedi .......................... 127/60 |
| 4,209,503 | 6/1980 | Shah .............................. 424/49 |
| 4,263,334 | 4/1981 | McGinley ......................... 426/573 |
| 4,276,312 | 6/1981 | Merritt ........................... 426/96 |
| 4,291,065 | 9/1981 | Zobel et al. ...................... 426/549 |
| 4,305,964 | 12/1981 | Moran ............................. 426/99 |
| 4,308,294 | 12/1981 | Rispoli et al. .................... 426/564 |
| 4,423,084 | 12/1983 | Trainor et al. .................... 426/589 |
| 4,477,480 | 10/1984 | Seidel et al. ..................... 426/578 |

(List continued on next page.)

FOREIGN PATENT DOCUMENTS 1016006 8/1977 Canada .

(List continued on next page.)

OTHER PUBLICATIONS

Tegge, "Produkte der sauren Stärkehydrolyse", Die Stärken, pp. 244–246 (1981). (English translation).

(List continued on next page.)

Primary Examiner—Arthur L. Corbin
Attorney, Agent, or Firm—Arnold, White & Durkee

[57] ABSTRACT

A processed meat article having a reduced level of fat and/or oil is provided. The article contains a fragmented granular starch hydrolysate. The fragmented granular starch hydrolysate is capable of forming an aqueous dispersion at 20% starch hydrolysate solids having a yield stress of from about 100 to about 1,500 pascals. The article is in the form of a patty or a molded sausage product, either being prepared from coarse ground meat and/or a meat emulsion.

20 Claims, No Drawings

U.S. PATENT DOCUMENTS

| | | | |
|---|---|---|---|
| 4,492,714 | 1/1985 | Cooper et al. | 426/602 |
| 4,510,166 | 4/1985 | Lenchin et al. | 426/565 |
| 4,533,254 | 8/1985 | Cook et al. | 366/176 |
| 4,536,408 | 8/1985 | Morehouse et al. | 426/250 |
| 4,551,177 | 11/1985 | Trubiano et al. | 106/210 |
| 4,560,559 | 12/1985 | Ottenberg | 426/19 |
| 4,587,131 | 5/1986 | Bodor et al. | 426/603 |
| 4,591,507 | 5/1986 | Bodor et al. | 426/604 |
| 4,643,773 | 2/1987 | Day | 127/30 |
| 4,670,272 | 6/1987 | Chen | 426/573 |
| 4,726,957 | 2/1988 | Lacourse | 426/578 |
| 4,728,526 | 3/1988 | Avera | 426/633 |
| 4,744,987 | 5/1988 | Mehra | 424/156 |
| 4,761,292 | 8/1988 | Augustine et al. | 426/321 |
| 4,787,939 | 11/1989 | Barker | 127/37 |
| 4,810,646 | 3/1989 | Jamas | 435/101 |
| 4,814,195 | 3/1989 | Yokohama | 426/633 |
| 4,828,868 | 5/1989 | Lasdon | 426/633 |
| 4,832,977 | 5/1989 | Avera | 426/633 |
| 4,859,484 | 8/1989 | Bielskis | 426/96 |
| 4,869,919 | 9/1989 | Lowery | 426/604 |
| 4,885,180 | 12/1989 | Cochran et al. | 426/241 |
| 4,886,678 | 12/1989 | Chiu | 426/578 |
| 4,911,946 | 3/1990 | Singer et al. | 426/658 |
| 4,917,915 | 4/1990 | Cain et al. | 426/573 |
| 4,937,091 | 6/1990 | Zallie | 426/582 |
| 4,942,055 | 7/1990 | Avera | 426/633 |
| 4,948,615 | 8/1990 | Zallie | 426/573 |
| 4,957,750 | 8/1990 | Cochran et al. | 426/19 |
| 4,962,094 | 10/1990 | Jamas | 514/54 |
| 4,971,723 | 11/1990 | Chiu | 252/315.3 |
| 4,981,709 | 1/1991 | Furcsik et al. | 426/565 |
| 4,988,531 | 1/1991 | Moore | 426/578 |
| 4,990,355 | 2/1991 | Gupta | 426/602 |
| 5,034,240 | 7/1991 | Tanaka et al. | 426/607 |
| 5,035,904 | 7/1991 | Huang et al. | 426/243 |
| 5,037,929 | 8/1991 | Rajagopalan | 426/578 |
| 5,051,271 | 9/1991 | Iyengar et al. | 426/658 |
| 5,094,872 | 3/1992 | Furcsik et al. | 426/578 |
| 5,104,674 | 4/1992 | Chen et al. | 426/573 |
| 5,106,644 | 4/1992 | El-Nokaly | 426/603 |
| 5,110,612 | 5/1992 | Quarles | 426/573 |
| 5,131,953 | 7/1992 | Kasica | 127/65 |
| 5,137,742 | 8/1992 | Bakal | 426/589 |
| 5,147,665 | 9/1992 | Furcsik | 426/19 |
| 5,192,569 | 3/1993 | McGinley et al. | 426/96 |

FOREIGN PATENT DOCUMENTS

| | | |
|---|---|---|
| 0052899 | 2/1982 | European Pat. Off. |
| 0237120 | 9/1987 | European Pat. Off. |
| 0298561 | 1/1989 | European Pat. Off. |
| 0327120 | 8/1989 | European Pat. Off. |
| 0327288 | 8/1989 | European Pat. Off. |
| 0340035 | 11/1989 | European Pat. Off. |
| 0367064 | 5/1990 | European Pat. Off. |
| 0372184 | 6/1990 | European Pat. Off. |
| 0387940 | 9/1990 | European Pat. Off. |
| 0420314 | 4/1991 | European Pat. Off. |
| 0420315 | 4/1991 | European Pat. Off. |
| 0427312 | 5/1991 | European Pat. Off. |
| 0430329 | 6/1991 | European Pat. Off. |
| 0443844 | 8/1991 | European Pat. Off. |
| 0470870 | 2/1992 | European Pat. Off. |
| 0480433 | 4/1992 | European Pat. Off. |
| 0486936 | 5/1992 | European Pat. Off. |
| 110957 | 4/1987 | Germany . |
| 3-296501 | 12/1991 | Japan . |
| 4-46901 | 2/1992 | Japan . |
| 2247242 | 2/1992 | United Kingdom . |
| 8704465 | 7/1987 | WIPO . |
| 8912403 | 12/1989 | WIPO . |
| 9000010 | 1/1990 | WIPO . |
| WO90/06343 | 6/1990 | WIPO . |
| WO90/15147 | 12/1990 | WIPO . |
| WO91/01092 | 2/1991 | WIPO . |
| 9101091 | 2/1991 | WIPO . |
| 9107106 | 5/1991 | WIPO . |
| 9112728 | 9/1991 | WIPO . |
| WO92/02614 | 2/1992 | WIPO . |
| WO92/21703 | 12/1992 | WIPO . |

OTHER PUBLICATIONS

"STELLAR Fat Replacer, Structure", technical information bulletin, A. E. Staley Mfg. Co., TIB 29 195060 (Jun. 1991).

"STELLAR Fat Replacer", technical data sheet, A. E. Staley Mfg. Co., TDS 513 192250 (Jun. 1991).

"STELLAR Fat Replacer, Handling, Storage, and Preparation", technical information bulletin, A. E. Staley Mfg. Co., TIB 28 195060 (Jun. 1991).

Ambler, "Centrifugation", Handbook of Separation Techniques for Chemical Engineers, pp. 4–60 to 4–88 (McGraw Hill 1988).

BeMiller, "Gums", Encyclopedia of Food Science & Technology, vol. 2, pp. 1338–1344 (John Wiley & Sons 1992).

Duxbury, "Pre-hydrated gums eliminate lumping, long hydration times," Food Processing, pp. 44–48 (Jun. 1992).

(List continued on next page.)

OTHER PUBLICATIONS

Falkiewicz, "Avicel in suspension—dispersion, rheology and colloid science", Soap, Cosmetics, Chemical Specialties, pp. 27–34 (Apr. 1979).

Faulkner et al, "Size reduction", Encyclopedia of Chemical Technology, vol. 21, pp. 132–162 (Kirk-Othmer eds., John Wiley & Sons, 1983).

Jane et al, "Structure studies of amylose-V complexes and retrograded amylose by action of alpha amylases, and a new method for preparing amylodextrins", Carbohydrate Research, vol. 132, pp. 105–118 (1984).

Lansky et al, "Properties of the fractions and linear subfractions from various starches", vol. 71, pp. 4066–4075 (1949).

Larsson et al, "Annealing of starch at an intermediate water content", Starch/Starke, vol. 43, No. 6, pp. 227–231 (Jun. 1991).

Lavanchy et al, "Centrifugal separation", Encyclopedia of Chemical Technology, vol. 5, pp. 194–233 (Kirk-Othmer, eds., John Wiley & Sons, 3d ed., 1979).

Manley, Technology of Biscuits, Crackers and Cookies, pp. 335–347 (Ellis Horwood 1983).

Mason, "Chemistry with ultrasound", Critical Reports on Applied Chemistry, vol. 28, pp. 1–26, 91–98, 159–187 (Elsevier Science Publishers 1990).

Matthews, Legumes: Chemistry, Technology, and Human Nutrition, pp. 226–229 (Marcel Dekker 1989).

Matz, Cookie and Cracker Technology, pp. 163–167 (AVI Publishing 1968).

Pancoast et al, Handbook of Sugars, pp. 157–287 (AVI Publishing 1980).

Patterson, Hydrogenation of Fats and Oils, pp. 44–48, 173–182, 291–304 (Applied Science Publishers, 1983).

Sievert et al, "Enzyme resistant starch. I. Characterization and evaluation of enzymatic, thermoanalytical, and microscopic methods", Cereal Chemistry, vol. 66, pp. 342–347 (1989).

Stute, "Hydrothermal modification of starches: the difference between annealing and heat/moisture-treatment", Starch/Staerke, vol. 44, pp. 205–214 (1992).

Teot, "Resins, water-soluble", Encyclopedia of Chemical Techology, vol. 20, pp. 207–230 (John Wiley & Sons 1982).

Trout, "Pasteurization", Encyclopedia of Food Science, pp. 600–604 (Peterson et al eds., AVI Publ. Co., 1978).

Whistler et al, "Effect of acid hydrolysis on the retrogradation of amylose", Cereal Chemistry, vol. 25, No. 6, pp. 418–424 (1948).

"Paselli SA2; The Natural Alternative to Fats and Oils" (AVEBE b.a., Foxhol, Holland, Ref. No. 05.12.31.167 EF).

R. L. Whistler, et al., Starch: Chemistry and Technology, pp. 25–35 (Academic Press, Inc., N.Y., N.Y., 1984).

J. Bouchard, et al., "High-Performance Liquid Chromatographic Monitoring of Carbohydrate Fractions in Partially Hydrolyzed Corn Starch", J. Agric. Food Chem., vol. 36, pp. 1188–1192 (1988).

F. Reuther, et al., "Structure of Maltodextrin Gels—A Small X-Ray Scattering Study", Colloid & Polymer Science, 261, pp. 271–276 (1983).

S. Nara, et al., "Study on Relative Crystallinity of Moist Potato Starch", Starke/Starch, vol. 30, pp. 111–114 (1978).

S. J. Richardson, "Molecular Mobilities of Instant Starch Gels Determined by Oxygen-17 and Carbon-13 Nuclear Magnetic Resonance", Journal of Food Science, vol. 53, No. 4, pp. 1175–1180 (1988).

C. Luu, et al., "Model Structure for Liquid Water", Travaux de la Scoiete de Pharmacie de Montpellier, vol. 41, No. 3, pp. 203–212 (1981).

D. C. White and G. N. Lauer, "Predicting Gelatinization Temperatures of Starch/Sweetener Systems for Cake Formulation by Differential Scanning Calorimetry. I. Development of a Model", Cereal Foods World, vol. 35, No. 8, pp. 728–731 (Aug. 1990).

C. Orr, "Size Measurement of Particles", Encyclopedia of Chemical Technology, vol. 21, pp. 106–162 (Kirk-Othmer, eds., John Wiley & Sons, Inc., N.Y., N.Y., 1983).

D. R. Paul and C. Morel, "Membrane Technology", Encyclopedia of Chemical Technology, vol. 15, pp. 92–131 (Kirk-Othmer, eds., John Wiley & Sons, Inc., N.Y., N.Y., 3d ed., 1981).

P. R. Klinkowski, "Ultrafiltration", Encyclopedia of Chemical Technology, vol. 23, pp. 439–461 (Kirk-Othmer, eds., John Wiley & Sons, Inc., N.Y., N.Y., 1983).

"Solve Tough Process Filtration Problems with Ceraflo Ceramic Systems", a technical bulletin, Lit. No. SD113, Feb. 1989 89–418, published (1989) by Millipore Corporation, Bedford, Mass.).

(List continued on next page.)

OTHER PUBLICATIONS

H. Reuter, "Homogenization", *Encyclopedia of Food Science*, pp. 374–376 (M. S. Peterson and A. H. Johnson, eds., AVI Publ. Co., Westport, Conn., 1978).

L. H. Rees and W. D. Pandolfe, "Homogenizers", *Encyclopedia of Food Engineering*, pp. 467–472 (C. W. Hall, et al., eds., AVI Publ. Co., Westport, Conn., 1986).

W. C. Griffin, "Emulsions", *Encyclopedia of Chemical Technology*, vol. 8, pp. 900–930 (Kirk-Othmer, eds., John Wiley & Sons, Inc., N.Y., N.Y., 3d ed., 1979).

T. H. Applewhite, "Fats and Fatty Oils", *Encyclopedia of Chemical Technology*, vol. 9, pp. 795–831 (Kirk-Othmer, eds., John Wiley & Sons, Inc., N.Y., N.Y., 3d ed., 1980).

"Food Labelling; Serving Sizes", 55 Fed. Reg 29517 (1990).

"Food Labelling; Definitions of the Terms Cholesterol Free, Low Cholesterol, and Reduced Cholesterol", 55 Fed. Reg 29456 (1990).

"Meat Processing", *Encyclopedia of Food Engineering*, pp. 545–557 (C. W. Hall, et al., eds., AVI Publ. Co., Westport, Conn., 2d ed., 1986).

K. Koizumi, et al., "High-Performance Anion-Exchange Chromatography of Homogeneous D-Gluco-Oligosaccharides and -Polysaccharides (Polymerization Degree equal to or greater than 50) with Pulsed Amperometric Detection", *Journal of Chromatography*, 464, pp. 365–373 (1989).

D. D. Duxbury, "Modified Food Starches Partially Replace Fats, Oils and Provide Smooth Texture", *Food Processing*, pp. 86 and 88 (Nov. 1990).

"Low-Fat Ground Beef Patties", a technical data sheet published Oct., 1991 by A. E. Staley Mfg. Co., Decatur, Ill.

"Low-Fat Pork Sausage Patty", a technical data sheet published Nov. 26, 1991 by A. E. Staley Mfg. Co., Decatur, Ill.

J. Giese, "Developing Low-Fat Meat Products", *Food Technology*, pp. 100–108 (Apr. 1992).

R. W. Kerr, *Chemistry and Industry of Starch*, pp. 564–567 (Academic Press, Inc., N.Y., N.Y., 2d ed., 1950).

Anon., "Oat-Bran-Based Ingredient Blend Replaces Fat in Ground Beef and Pork Sausage", *Food Technology*, pp. 60–66 (Nov. 1991).

G. H. Taki, "Functional Ingredient Blend Produces Low-Fat Meat Products to Meet Consumer Expectations", *Food Technology*, pp. 70–74 (Nov. 1991).

O. A. Battista, et al., "Colloidal Macromolecular Phenomena. Part II. Novel Microcrystals of Polymers, *Journal of Applied Polymer Science*, vol. 11, pp. 481–498 (1967).

N. Z. Erdie, et al., "Rheological Characteristics of Polymer Microcrystal-Gels", *Journal of Colloid and Interface Science*, vol. 28, p. 3647 (1968).

E. Dickinson, "Particle Gels", *Chemistry & Industry*, pp. 595–599 (Oct. 1990).

"NEPOL Amylose", Market Development Bulletin No. 101, A. E. Staley Mfg. Co., (1962).

J. Jane, et al., "Preparation and Proeprties of Small-Particle Corn Starch", *Cereal Chemistry*, vol. 69, pp. 280–283 (1992).

O. A. Battista, et al., "Microcrystalline Cellulose", *Industrial and Engineering Chemistry*, vol. 54, pp. 20–29 (1962).

"Avicel RC 581 Technical Bulletin", Bulletin No. RC-11 of FMC Corporation, Marcus Hook, Pa., Nov. 1969–1M.

"Avicel Microcrystalline Cellulose; The Non-Caloric Ingredient", a bulletin of American Viscose Corporation, Marcus Hook, Pa. (later a division of FMC Corporation).

"Avicel RC-591 in Foods", Bulletin No. RC-22, FMC Corporation, Marcus Hook, Pa. (May 1971).

"Avicel RC in Bakery Products", Bulletin No. RC-35, FMC Corporation, Marcus Hook, Pa.

"Avicel RC in Canned Foods", Bulletin No. RC-31, FMC Corporation, Marcus Hook, Pa. (May 1972).

"Avicel Pricing", a bulletin apparently of American Viscose Corporation, Marcus Hook, Pa. (later a division of FMC Corporation).

"C9-112 Microcrystalline Starch", a product bulletin of A. E. Staley Mfg. Co., Decatur, Ill.

A. H. Young, "Evaluation of Microcrystals Prepared from MIRA-QUIK C in the Pilot Plant Spray Dried in the Presence of Sodium Carboxymethylcellulose (C9-112), Project Report No. RD 73-17 of A. E. Staley Mfg. Co.

W. C. Mussulman and J. A. Wagoner, "Electron Microscopy of Unmodified and Acid-Modified Corn Starches", *Cereal Chemistry*, vol. 45, pp. 162–171 (1968).

M. Yamaguchi, et al., "Electron Microscopic Observa- (List continued on next page.)

OTHER PUBLICATIONS tions of Waxy Maize Starch", *Journal of Ultrastructure Research*, 69, pp. 249–261 (1979).

P. L. Russell, et al., "Characterisation of Resistant Starch from Wheat and Maize", *Journal of Cereal Science*, vol. 9, pp. 1–15 (1989).

O. B. Wurzburg, *Modified Starches: Properties and Uses*, pp. 18–23, 38–40, 244–245 and 250–252 (CRC Press, Inc., Boca Raton, Fla., 1986).

"Fat-Sparing Starch Can Replace 100% Fat/Oil for 96% Calorie Reduction", *Food Processing*, p. 38 (Dec. 1990).

W. A. Atwell, et al., "Characterization of Quinoa Starch", *Cereal Chemistry*, vol. 60, pp. 9–11 (1982).

"Staley Formulation of Food Starch-Modified", a new product review presented to the U.S. Food and Drug Administration by A. E. Staley Mfg. Co.

"New Generation of Foods with Reduced Fat", *Food Engineering*, pp. 23 and 26 (Jan. 1990).

G. R. Sanderson, "Polysaccharides in Foods", *Food Technology*, pp. 50–57 and 83 (Jul. 1981).

"Gums and Starches Bulk Up Low-Cal Foods", *Food Engineering* (Jan. 1990).

"STA-SLIM starches", a technical data sheet published by A. E. Staley Mfg. Co., Decatur, Ill.

"Reduced-Oil Salad Dressings", a technical data sheet published by A. E. Staley Mfg. Co., Decatur, Ill.

J. D. Dziezak, "Membrane Separation Technology Offers Processors Unlimited Potential", *Food Technology*, pp. 108–113 (Sep. 1990).

R. J. Swientek, "Microfluidizing Technology Enhances Emulsion Stability", *Food Processing*, pp. 152–153 (Jun. 1990).

*RANNIE High Pressure Laboratory Homogeniser*, a service manual, Rannie a/s, Roholmsvej 8, DK-2620 Albertslund, Denmark).

R. D. Spies and R. C. Hoseney, "Effect of Sugars on Starch Gelatinization", *Cereal Chemistry*, vol. 59, No. 2, pp. 128–131 (1982).

H. L. Savage, et al., "Effects of Certain Sugars and Sugar Alcohols on the Swelling of Cornstarch Granules", *Cereal Chemistry*, vol. 55, No. 4, pp. 447–454.

K, Ghiasi, et al., "Effects of Flour Components and Dough Ingredients on Starch Gelatinization", *Cereal Chemistry*, vol. 60, No. 1, pp. 58–61 (1982).

W. J. Stadelman, et al., *Egg and Poultry-Meat Processing*, pp. 52–63 (Ellis Horwood Ltd., Chichester, England, 1988).

N. Krog, "Functions of Emulsions in Food Systems", *J. Am Oil Chemists' Society*, vol. 54, pp. 124–131 (1977).

J. D. Dziezak, "Emulsifiers: The Interfacial Key to Emulsion Stability", *Food Technology*, vol. 42, No. 10, pp. 171–186.

E. M. A. Willhoft, "Recent Development on the Bread Staling Problem", *The Bakers Digest*, pp. 14–20 (Dec. 1973).

W. H. Knightly, "The Evolution of Softeners and Conditioners Used in Baked Foods", *The Bakers Digest*, pp. 64–75 (Oct. 1973).

P. Richards, *Breads, Rolls and Sweel Doughs*, pp. 92–95 (Peacock Business Press, 1973).

Data Base WPIL/Derwent AN-80-66061C (38), Derwent Publications Ltd., London, England, abstract of German Patent DD-A-142646 (H. Richter) (Jul. 10, 1980).

Data Base WPIL/Derwent AN-85-210261 (35), Derwent Publications Ltd. London, England, abstract of German Patent DD-A-161178 (Akad Wissenschaft DDR) (May 2, 1985).

Data Base WPIL/Derwent AN-85-245675 (40), Derwent Publications Ltd., London, England, abstract of Japanese Patent No. JP-A-60160833 (Miyoshi Yushi KK) (Aug. 22, 1985).

REDUCED FAT MEAT PRODUCTS

This application is a continuation of U.S. Ser. No. 07/896,096, filed on Jun. 10, 1992, now abandoned, which is a continuation-in-part of U.S. Ser. No. 07/578,994, filed on Sep. 6, 1990, now abandoned, which is a continuation-in-part of U.S. Ser. No. 07/483,208, filed on Feb. 20, 1990, now abandoned.

FIELD OF THE INVENTION

This invention relates to food formulations in which at least a portion of the fat and/or oil is replaced by a carbohydrate.

BACKGROUND OF THE INVENTION

U.S. Pat. No. 4,510,166 (Lenchin et al. ) discloses converted starches having a DE less than 5 and certain paste and gel characteristics which are used as a fat and/or oil replacement in various foods, including ice cream and mayonnaise. The converted starches are described as dextrins, acid-converted starches (fluidity starches), enzyme-converted starches and oxidized starches. It is also disclosed that if the converted starches are not rendered cold-water soluble by the conversion, they are pregelatinized prior to use or cooked during use.

A product bulletin entitled "Paselli SA2; The Natural Alternative to Fats and Oils" (Avebe b.a., Foxhol, Holland, Ref. No. 05.12.31.167 EF) discloses the use of a low-DE-hydrolysate (DE less than 3) made from potato starch as a replacement for fifty percent of the fat with an amount of the low-DE-potato starch hydrolysate plus water (starch hydrolysate at 28% dry solids) equal to the amount of fat replaced.

U.S. Pat. Nos. 3,962,465 (Richter et al.) and 3,986,890 (Richter et al. ) disclose the use of thermoreversible gels of a starch hydrolysate (formed by enzymatic hydrolysis) as a substitute for fat in a variety of foods, including cake creams and fillings, mayonnaise and remoulades, cream cheeses and other cheese preparations, bread spreads, pastes, meat and sausage products, and whipped cream.

The preparation of ready-to-spread frostings having reduced levels of calories is disclosed in U.S. Pat. No. 4,761,292 (Augustine et al.). The patent discloses a frosting which contains (a) about 40 to 85 weight percent sugar, at least about 20 weight percent of which comprises fructose; (b) about 1 to 12 weight percent of a granular starch having a cold-water solubility of greater than 50 weight percent and a fat content of less than 0.25 weight percent; (c) about 5 to 30 weight percent fat; and (d) about 10 to 30 weight percent water. The patent also discloses, at column 5, lines 25–38, that the preferred frostings contain 8 to 18 weight percent fat in comparison to conventional frostings which routinely contain about 18 to 30 weight percent fat.

SUMMARY OF THE INVENTION

This invention relates to processed meat products having reduced levels of fat comprising a ground meat patty having incorporated therein a minor amount of an aqueous dispersion of a fragmented granular starch hydrolysate comprised of a major amount of cold-water insoluble starch hydrolysate and a minor amount of cold-water soluble starch hydrolysate.

This invention also relates to processed meat products having reduced levels of fat comprising a molded sausage product having incorporated therein a minor amount of an aqueous dispersion of a fragmented granular starch hydrolysate comprised of a major amount of cold-water insoluble starch hydrolysate and a minor amount of cold-water soluble starch hydrolysate. By molded sausage product is meant a coarse ground meat filled or meat emulsion filled product produced by stuffing a casing or a reusable mold, including frankfurters, bologna, and luncheon meats, as well as traditional sausages (e.g. salami, Polish sausage, etc.). Of course, the product of the stuffing operation carl be subsequently sliced to form patties.

The use of the terms "major" and "minor" in context together in this specification is meant to imply that the major component is present in a greater amount by weight than the minor component, and no more nor less should be inferred therefrom unless expressly noted otherwise in context.

DETAILED DESCRIPTION OF THE INVENTION

This invention employs a fragmented granular starch hydrolysate. The granular starch hydrolysate will be capable of forming a particle gel upon fragmentation of the granular starch hydrolysate in an aqueous medium. The preparation of fragmented granular starch hydrolysates useful herein is disclosed in PCT Appln. No. PCT/US91/01029, published Sep. 5, 1991 as WO 91/12728, the disclosure of which is incorporated herein by reference.

The fragmented granular starch hydrolysate is made by the sequential acid-hydrolysis and fragmentation of a granular starch material, preferably derived from a starch having a major proportion of amylopectin. Starch is generally comprised of a highly-branched glucan having alpha-1,4 and alpha-1,6 linkages, denominated amylopectin, and a substantially linear glucan, having almost exclusively alpha-1,4 linkages, denominated amylose. Methods of determining the amounts of each are referenced in R. L. Whistler et al., *Starch: Chemistry and Technology*, pp. 25–35 (Academic Press, Inc., New York, N.Y., 1984), the disclosure of which is incorporated by reference. Examples of starches having a major proportion of amylopectin include the common non-mutant starches of cereals and legumes, e.g. corn, wheat, rice, potato and tapioca, and mutant varieties comprised of a major proportion of amylopectin, e.g. waxy maize. Preferred for use herein are common corn starch and waxy maize starch.

As used herein, the term "granular starch" refers to a starch composition in which the native granular structure is retained. Thus, this term, without further limitations, includes common starches and starches isolated from mutant varieties, e.g. waxy maize starch and high amylose corn starch. High amylose corn starch is commercially available in native granular form and having an amylose content within the range of about 50% to about 80%. For example, native granular starches, one with an amylose content of 55% to 60% and the other with about 70%, are available from National Starch and Chemical Corporation, Bridgewater, N.J., HYLON TM and HYLON VII, respectively. The starch should be in the native granular form to be useful as a starting material. This form is resistant to hydration and/or gelatinization during the acid-hydrolysis, and thus, fragments of the starch will retain many of the structural features of the native granule, e.g. the lamellae resulting from the growth pattern of the granule. By "gelatinization temperature" is meant the temperature at which a majority (by weight) of the granular starch starting material is "gelatinized" or "pasted". In other words, a product in which the gelatinization occurs with respect to a minor amount of the granular starch starting material is within the scope of the granular starch hydrolysate, unless otherwise noted.

Various pretreatments of the native granule starting material can be performed so long as the resistance to gelatinization during acid-hydrolysis is preserved. A particularly useful pretreatment is defatting of the granule, e.g. by an alkaline wash as described in U.S. Pat. No. 4,477,480 (Seidel et al.), the disclosure of which is incorporated herein by reference, and/or a solvent extraction as described in U.S. Pat. Nos. 3,717,475 and 3,586,536 (Germino), the disclosures of which are incorporated by reference. The granular starch from which the hydrolysate is made should generally contain less than about 1.5% fatty acids and proteins. Because the hydrolysis is accomplished in a predominantly aqueous medium and is typically washed with only water, the hydrolysis will not remove any substantial portion of the lipids present in the starch. Further, because a substantial portion of the starch is hydrolyzed to products soluble in the aqueous medium and subsequent wash water, the hydrolysis and washing will remove starch solids and, thus, result in a lipid content on a weight percentage basis that is higher for the hydrolysate than the parent starch.

The acid-hydrolysis of the granular starch is performed to permit mechanical disintegration of the granular starch hydrolysate residue to a degree that will allow the formation of an aqueous dispersion that is salve-like. The hydrolysate will be capable upon mechanical disintegration of forming an aqueous dispersion (at about 20% hydrolysate solids) having a yield stress of from about 100 to about 1,500 pascals (for example, from about 200 to about 800 pascals or from about 200 to about 600 pascals), but more preferably from about 400 to about 1,500 pascals, and most preferably at least about 500 pascals.

The yield stress of an aqueous dispersion of fragmented starch hydrolysate has been found to correlate well with the fat-like consistency of the aqueous dispersion. In other words, if the yield stress is in an appropriate range, the aqueous dispersion will generally exhibit a fat-like consistency. However, yield stress may not correlate well with properties other than consistency. For example, a sample with an appropriate yield stress may exhibit a gritty mouthfeel (i.e. grittiness) due to aggregation of the insoluble hydrolysate particles (e.g. as a result of freeze-thaw of an aqueous dispersion of fragmented starch hydrolysate). Further, the correlation between yield stress and fat-like consistency may not hold in the converse for all fragmented starch hydrolysates described herein. In other words, a particular fragmented starch hydrolysate may exhibit a fat-like consistency under some conditions, but not exhibit an appropriate yield stress. In sum, while yield stress exhibits a useful correlation with fat-like consistency, yield stress is not believed to be a perfect predictor of fat mimicking properties of a fragmented starch hydrolysate.

An aqueous dispersion of fragmented granular starch hydrolysate should exhibit theological properties characteristic of a particle gel. One measure of these properties is provided by measuring the dynamic elastic modulus (G') over a range of shear strain. A particle gel will exhibit a transition in G' versus shear strain from a substantially constant G' to a decreasing G' as shear strain increases. The transition indicates fracture of the particle network within the particle gel and is typically a sharp transition at a relatively low (compared to a polymer gel) shear strain. The particle gels useful herein will typically exhibit such a transition at less than about 50 millistrain, and preferably less than about 20 millistrain.

In general, the starch hydrolysate will have a peak molecular weight as measured by gel permeation chromatography of from about 2,000 g/mol to about 10,000 g/mol, preferably from about 3,500 g/mol to about 5,000 g/mol and more preferably from about 4,500 g/mol to about 5,000 g/mol.

It has been found that the weight average molecular weight ($M_W$) as measured by gel permeation chromatography exhibits a better correlation (better than PMW) to the yield stress of an aqueous dispersion of the fragmented starch hydrolysate. The $M_W$ should generally range from about 3,000 to about 12,000, preferably about 4,000 to about 7,500 and more preferably 4,500 to about 6,500. Of course, $M_W$ also correlates to peak molecular weight, but some factors (e.g. the efficiency of washing of the product centrifuge cake which can affect the cold-water solubles content of the product) can affect the degree of correlation between $M_W$ and peak molecular weight from lot to lot of a given production run. Molecular weights of starch hydrolysates can be measured by the procedure described by J. Bouchard et al., "High-Performance Liquid Chromatographic Monitoring of Carbohydrate Fractions in Partially Hydrolyzed Corn Starch", *J. Agric. Food Chem.*, Vol. 36, pp. 1188–1192 (1988), the disclosure of which is incorporated herein by reference.

The Dextrose Equivalent (by Lane-Eynon method DE) of the starch hydrolysate will vary based on the precise degree of hydrolysis and the efficiency of the washing of the starch hydrolysate, but will typically be greater than about 3, more typically greater than about 5, e.g. from about 5.0 to 7.0.

The starch hydrolysates, and fragmented dispersions thereof, can be analyzed by a variety of techniques. For example, low angle (or "small angle") X-ray scattering experiments can be performed on an aqueous dispersion of a fragmented starch hydrolysate and the results (particularly those in the Porod region of the spectrum) may show an ordering (or lack thereof) in the dispersion in the range of tens to hundreds of angstroms. Such low-angle X-ray scattering techniques are described in F. Reuther, et al., "Structure of Maltodextrin Gels—A Small Angle X-Ray Scattering Study", *Colloid and Polymer Science*, 261, 271–276 (1983), the disclosure of which is incorporated by reference. Further, wide angle X-ray scattering techniques (e.g. those described by S. Nara, et al., "Study on Relative Crystallinity of Moist Potato Starch", *Starke/Starch*, Vol. 30, pp. 111–114 (1978)) can be performed on the starting starch, the starch hydrolysate powder and on the aqueous dispersion of fragmented starch hydrolysate to examine the effects of hydrolysis and/or fragmentation on the ordering of the starch material in the range of about 1–15 angstroms, i.e., ordering related to the distances between atoms in the starch material.

Nuclear magnetic resonance techniques (e.g. those described by S. Richardson, "Molecular Mobilities of Instant Starch Gels Determined by Oxygen-17 and Carbon-13 Nuclear Magnetic Resonance", *Journal of*

Food Science, Vol. 53, No. 4, pp. 1175–1180 (1988)) can be used to show the electronic environment of atomic nuclei in the starch hydrolysate, e.g. $C^{13}$, and thus give information relating to molecular structure and disposition (e.g. carbohydrate ring conformations, Vander Waals bonding, etc.). The technique of measuring water mobility (or immobility, its inverse) by oxygen-17 NMR may be supplemented with Raman infra-red spectroscopy techniques in the "water-band" of the infra-red portion of the spectrum (e.g. techniques such as those described by C. Lun, et al., "Model Structure for Liquid Water", *Travaux de la Societe de Pharmacie de Montpellier*, Vol. 41, No. 3, pp. 203–212 (1981), the disclosure of which is incorporated herein by reference). Differential Scanning Calorimetry (DSC) can be employed to examine the solubility of the starch hydrolysate in water (before and/or after fragmentation) over various temperatures. Such DSC techniques are described, for example, by D. C. White and G. N. Lauer, "Predicting Gelatinization Temperatures of Starch/Sweetener Systems for Cake Formulation by Differential Scanning Calorimetry. I. Development of a Model", *Cereal Foods World*, Vol. 35, No. 8, pp. 728–731 (August 1990), the disclosure of which is incorporated by reference.

It should also be noted that the mean particle size of the starch hydrolysate, before and after fragmentation, can be measured by a variety of different means. However, the utility of such information must be considered carefully in view of the considerations noted by C. Orr, "Particle Size Measurement", *Encyclopedia of Chemical Technology*, Vol. 21, pp. 106–131 (Kirk-Othmer, eds., John Wiley & Sons, Inc., New York, N.Y., 1983), the disclosure of which is incorporated by reference. With this caveat in mind, it should be mentioned that the mean particle size, as measured by certain techniques, of the starch hydrolysate may appear to be substantially the same, e.g. about 10 microns (by light scattering techniques). However, when the aqueous dispersion of fragmented starch hydrolysate is analyzed to determine the surface area of the fragments, a mean particle size on the order of 50 angstroms to 200 angstroms may be inferred therefrom. Without wishing to be bound by any particular theory, unless otherwise noted, this particle size information suggests that the aqueous dispersion of fragmented starch hydrolysate contains agglomerates of fragments, such agglomerates being on the order of 10 microns in size and being comprised of individual fragments on the order of 50–200 angstroms. Further, it may be theorized that the agglomerates are malleable in the dispersion such that they deform (and perhaps undergo inter-agglomerate exchange of fragments) in a manner that imparts the property of plasticity to the dispersion. This plasticity may then give rise to the fat-like or salve-like consistency of the dispersion. This theory may also account for the fat-like mouth-clearing of the dispersion observed in many foods, e.g. frozen desserts. However, it should again be noted that these theories must be considered as such, unless otherwise expressly noted herein.

The acid hydrolysis can be accomplished in an essentially aqueous slurry of the starch. Typical conditions will include a starch slurry at 30% to 40% starch solids in 0.25N to 2.5N mineral acid (e.g. hydrochloric acid or sulfuric acid) maintained at a temperature of from about 50° C. to about 70° C., preferably from about 55° C. to about 60° C., more preferably from about 57° C. to about 62° C., for from about 8 to about 20 hours, preferably from about 10 to about 16 hours, when the acid is about 1N (and from about 8 to about 48 hours, preferably from about 20 to about 30 hours when the acid is about 0.5N). Variations within and around the scope of these parameters to optimize a particular set of conditions in conjunction with the means and degree of mechanical disintegration described below will be within the skill of the art given the examples set forth below.

It is believed that the moderate temperatures employed will reduce the amounts of reversion products produced during hydrolysis. Because reversion products tend to contribute off-flavors to the hydrolysate, minimizing their production should enhance the organoleptic acceptability of the hydrolysate by ensuring the production of a hydrolysate with a desirably bland taste. Likewise, the moderate reaction times will reduce opportunity for the development of rancidity in the hydrolysate that may occur over longer reaction times, e.g. more than a few days, as a result of the breakdown of even small amounts of residual lipids.

The hydrolysis medium is essentially aqueous. Generally, it will contain no more than a trace, if any, of organic solvents (e.g. ethanol). Organic solvents may react with the saccharide by-products (e.g. dextrose to form at least traces of ethyl glucoside), may otherwise affect the hydrolysis reaction (e.g. solvent effects) and/or may contaminate the starch hydrolysate product.

The progress of the hydrolysis may be followed by taking small samples of slurry from an in-progress batch of the starch hydrolysate, adjusting the pH of the slurry (e.g. to 4–5), isolating the solid starch hydrolysate residue from the slurry sample, and mechanically disintegrating the residue under the conditions intended for the batch as a whole. The yield stress of a 20% aqueous dispersion can then be measured to determine if the acid-hydrolysis has progressed to a desired degree. Also, samples of insoluble residue can be isolated for a determination of peak molecular weight (or weight average molecular weight) by gel permeation chromatography or of supernatant for dextrose content (YSI method) and the results used as a measure of the degree of hydrolysis; both molecular weight (particularly $M_W$) and dextrose content have been found to correlate well with yield stress of the resulting starch hydrolysate upon fragmentation, as discussed below.

It has been found that there is very little, if any, change in the degree of branching of the glucan chains of the starch as a result of the acid hydrolysis. Thus, the ratio of 1,4 linkages to 1,6 linkages in the hydrolysate will generally be substantially the same as that of the starting amylopectin starch. Given the typical degree of branching of amylopectin and amylose, a starch comprised of a major proportion of amylopectin (i.e., greater than 50% by weight of the dry solids of the starch is glucan in the form of amylopectin) will exhibit a ratio of alpha-1,4 linkages to alpha-1,6 linkages of less than about 40:1. Thus, the starch hydrolysates will generally have a ratio of alpha-1,4 linkages to alpha-1,6 linkages of less than about 40:1, typically, from about 20:1 to about 40:1.

It has also been found that the crystalline form of the parent starch, as determined by X-ray diffraction, is retained without substantial change, although the relative crystallinity of the starch hydrolysate is generally greater than the parent starch. Thus, native waxy maize and native common corn starch (both of which are substantially free of the "B" type crystalline form) will generally yield hydrolysates that are substantially free of the "B" type as determined by X-ray diffraction.

The starch hydrolysis product of the slurry is isolated as the solid phase residue by separation thereof from the aqueous phase of the slurry. Techniques for such isolation include filtration (e.g. horizontal belt filtering), centrifugation (e.g. disk, decanter or solid bowl), sedimentation, and other suitable dewatering operations. It should also be noted that the efficiency of the separation of the insoluble starch hydrolysate residue from the aqueous liquid phase of the hydrolysate slurry and the degree of washing of the residue will affect the relative amounts of cold-water insoluble hydrolysate and cold-water soluble hydrolysate in the residue. However, it appears that tile residue is relatively resistant to washing in the sense that relatively large amounts of cold-water solubles remain after washing (by simple reslurrying and recentrifugation at ambient temperatures). Thus, while the washing of the residue will affect the amount of cold-water soluble hydrolysate, conventional washing appears to have a surprisingly small effect.

The acid in the slurry can be neutralized either before or after isolation of the hydrolysate. However, it has been found particularly advantageous (in terms of obtaining a desirably bland flavor for the hydrolysate) to (i) only partially neutralize the slurry to a weakly acidic pH (e.g. from about 2.0 to about 3.5) and (ii) then hold the slurry at a moderately elevated temperature (e.g. 25° C. to 75° C.) for a short period of time (e.g. 15 minutes to 24 hours), prior to isolation, followed by washing and then neutralization of the solid hydrolysate residue to a substantially neutral pH (e.g. about 4.5 to about 5.0). This acid washing of the starch hydrolysate is particularly advantageous when employed in the context of microfiltration of the starch hydrolysate slurry using a ceramic microfiltration membrane contained within an acid resistant (e.g. polyvinyl chloride) housing.

It has been found that microfiltration is an effective means of separating an insoluble starch hydrolysate residue from an aqueous slurry thereof which also contains a relatively large amount of dissolved species, e.g. salt and saccharides. Microfiltration is described generally in D. R. Paul and C. Morel, "Membrane Technology", *Encyclopedia of Chemical Technology*, Vol. 15, pp. 92–131 (Kirk-Othmer, eds., John Wiley & Sons, New York, N.Y., 3d ed., 1981), the disclosure of which is incorporated herein by reference.

Typically, a liquid including small dissolved molecules is forced through a porous membrane. Large dissolved molecules, colloids and suspended solids that cannot pass through the pores are retained. Components retained by the membrane are collectively referred to as a concentrate or retentate. Components which traverse the membrane are referred to collectively as filtrate or permeate. Diafiltration is a microfiltration process in which the retentate is further purified or the permeable solids are extracted further by the addition of water to the retentate. This process is analagous to washing of a conventional filter cake. The use of microfiltration removes salts formed by the neutralization of the alkaline solution and other small molecular species.

Ultrafiltration is generally described and discussed by P. R. Klinkowski, "Ultrafiltration", *Encyclopedia of Chemical Technology*, Vol. 23, pp. 439:.461 (Kirk-Othmer, eds., John Wiley & Sons, New York, N.Y., 3d ed., 1983), the disclosure of which is incorporated by reference herein. Ultrafiltration is a pressure-driven filtration on a molecular scale. The porous membrane typically has a pore size ranging from 0.005 to 20 micrometers (or microns). While a distinction is often made in the separation art between ultrafiltration (pore size range of 2 to 20 nanometers) and microfiltration (pore size greater than 20 nanometers), the terms will be used interchangeably herein unless expressly noted otherwise.

By "microporous ceramic membrane" is meant any ceramic layer (including "supported layer articles") having micropores and sufficient structural integrity to withstand the pressure needed to isolate the insoluble starch hydrolysate residue from the liquid phase of the aqueous slurry over a desired period of time (e.g. from 15 minutes to 24 hours). It is believed that the high pressure used to isolate the insoluble starch hydrolysate residue creates turbulent flow at the membrane's surface which prevents small particles in the slurry from "blinding off" the pores of the membrane (as has been observed with conventional filtration equipment as discussed below).

A typical microporous ceramic membrane is comprised of a microporous ceramic article having at least one macroscopic passage therethrough (typically a cylindrical article having cylindrical passages) substantially parallel to the axis of symmetry of the cylindrical article. While the article may be "microporous" itself, the ceramic cylinder may act principally as a support (i.e. in a "supported layer article") for a microporous layer (or layers with regard to multi-passage articles) which covers the surfaces defined by the passages through the ceramic article. The porosity of the ceramic article, and any microporous layer associated therewith as described above, can be varied as desired, with the pore size of any such layer being smaller than that of the article. In typical operation, such a ceramic filter element (i.e. cylindrical and microporous ceramic article) is contained in hollow cylindrical housing and slurry is fed into the passages under pressure through a feed manifold that prevents leakage into the housing. The exit of the isolated starch hydrolysate residue from the passages at the other end of the ceramic filter element is controlled by an exit manifold which also prevents leakage into the housing where the filtrate or permeate is contained. Ceramic filter elements and their use are described in "Solve Tough Process Filtration Problems with Ceraflo Ceramic Systems", a technical bulletin, Lit. No. SD113, 2/89 89-418, published (1989) by Millipore Corporation, Bedford, Mass., the disclosure of which is incorporated by reference.

The isolated starch hydrolysate is typically washed and then dried (e.g. to a low moisture content, typically 3–8%) after isolation to allow for handling and storage prior to further processing. Examples of drying techniques include spray drying, flash drying, tray drying, belt drying, and sonic drying. The dried hydrolysate may be hygroscopic, given the presence of the cold-water soluble hydrolysate therein. Thus, some rehydration during handling and storage may occur. Depending upon the precise composition of the hydrolysate and the conditions (including length of time) of storage, steps to maintain the moisture at a low content may be necessary (e.g. moisture barrier packaging and/or control of humidity in the storage environment). If the moisture content is allowed to rise too far (e.g. greater than about 20%, or possibly greater than 15%), bulk handling problems and/or microbiological stability problems might arise.

A granular starch hydrolysate useful in the practice of this invention is commercially available from the A. E. Staley Manufacturing Company, Decatur, Ill., as STELLAR TM fat replacer.

In certain embodiments, this invention relates to a dry granular starch hydrolysate composition consisting essentially of a major amount by weight of cold-water insoluble hydrolysate and a minor amount ray weight of cold-water soluble hydrolysate, said dry, granular starch hydrolysate having (a) weight average molecular weight of from about 4,000 g/mol to about 7,500 g/mol, (b) a bland organoleptic character, and (c) an essentially dry moisture content.

It has been found that the granular starch hydrolysis process results in a granular starch hydrolysate composition that is particularly advantageous because of (i) the relative amounts of hydrolysate insolubles and hydrolysate solubles, (ii) weight average molecular weight, (iii) the bland organoleptic character of the granular starch hydrolysate, and (iv) edibility. This combination of properties is important to the use of the hydrolysate as a food ingredient, especially as a ;at mimicking ingredient in foods. An essentially dry moisture content is important with respect to the edibility of the composition, e.g. the ability to handle and process the composition into a food product and the microbiological stability of the composition on storage thereof. The composition consists essentially of the major and minor amounts of hydrolysates of different solubility in the sense that it is essentially free of organic solvents and reaction products thereof with hydrolysate components (e.g. ethanol and ethyl glucosides).

In certain embodiments, this invention employs a composition of matter comprising (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of a cold-water soluble hydrolysate, and (ii) a minor amount of salt selected from the group consisting of alkali metal chlorides, alkali metal sulfates, alkaline earth metal chlorides, alkaline earth metal sulfates, and mixtures of two or more thereof, said salt being present in an amount sufficient to produce an organoleptically fat-like aqueous dispersion upon fragmentation of said composition in an essentially aqueous medium at about 20% dry solids of said starch hydrolysate. Typically, said salt is present in an amount of at least 0.1% basis dry weight of said granular starch hydrolysate, preferably at least about 1%, and more preferably about 1% to about 3%.

In certain embodiments, this invention employs a composition of matter comprising a major amount by weight of a granular starch hydrolysate having a weight average molecular weight of less than about 12,000 g/mol and being comprised of a controlled amount of salt present in an amount sufficient to enhance the fat-like characteristics of the composition upon shearing in an aqueous medium, said salt selected from the group consisting of alkali metal chlorides, alkali metal sulfates, alkaline earth metal chlorides, alkaline earth metal sulfates, and mixtures thereof.

In another aspect, this invention employs a composition of matter comprising (i) a major amount by weight of a granular starch hydrolysate, said granular starch hydrolysate having a weight average molecular weight of less than about 12,000 g/mol and being comprised of a major amount by weight of cold-water insoluble hydrolysate and a minor amount by weight of cold-water soluble hydrolysate, and (ii) a carbohydrate saccharide (in addition to said cold-water soluble hydrolysate) in an amount effective (e.g. a comparable amount by weight, see below) in relation to the amount of said fragmented granular starch hydrolysate and said water to enhance the fat-like properties of said dispersion following either freezing or heating to a temperature of about 72° C.

In another aspect, this invention employs an aqueous dispersion useful as a replacement for fats and/or oils comprising a major amount by weight of water and a minor amount by weight of a fragmented granular starch hydrolysate, said fragmented granular starch hydrolysate being (i) comprised of a major amount by weight of cold-water insoluble hydrolysate material and a minor amount by weight of cold-water soluble hydrolysate material and (ii) capable of imparting to said dispersion at about 20% solids a yield stress of from about 100 to about 1,500 pascals.

It is believed that the cold-water soluble hydrolysate material improves the water immobilization capability of such cold-water insoluble hydrolysate material, as compared to aqueous dispersion containing only cold-water insoluble material at the same level of cold-water insoluble material solids. In general, the "minor amount" will be a significant amount in terms of its effect on the properties of the composition, e.g. the ratio of cold-water insoluble to cold-water soluble will be no greater than about 9:1, typically less than about 5:1, and preferably from about 3.0:1 to about 4.0:1.

The fragmented starch hydrolysate may also be otherwise chemically modified. Examples of such chemical modification include the product of reaction with bleaching agents, e.g. hydrogen peroxide, peracetic acid, ammonium persulfate, chlorine (e.g. calcium and/or sodium hypochlorite or sodium chlorite), and permanganate (e.g. potassium permanganate); esterifying agents (e.g. acetic anhydride, adipic anhydride, octenyl succinic anhydrides, succinic anhydride, vinyl acetate); including phosphorous compounds (e.g. monosodium orthophosphate, phosphorous oxychloride, sodium tripolyphosphate, and sodium trimetaphosphate); and/or etherifying agents (e.g. acrolein, epichlorohydrin, and/or propylene oxide). Such chemical modifications will typically be accomplished after the acid hydrolysis step, but may be accomplished prior to the acid hydrolysis or effected by using a modified starch as a starting material for the acid hydrolysis step. Even esterified starches (e.g. starch modified with octenyl succinic anhydride) can be used as a starting material and significant ester functionality will be retained, as demonstrated by example below.

Following acid-hydrolysis (and neutralization of the slurry), the granular starch hydrolysate is subjected to a physical fragmentation as by mechanical disintegration, i.e. fragmented. As used herein, "fragmented" means that a majority of the starch granules have been so fragmented that they no longer exhibit, under microscopic examination, the macro-organization of the granule, e.g. the shape characteristic of that variety of granule. Generally, the concentric shells of material that are observed in the granule after the hydrolysis are not observed in a majority of the granules after fragmentation. However, the native crystallites present in the granule are retained (as confirmed by X-ray diffraction of the salves).

The mechanical disintegration of the hydrolysate may be carried out in several ways, as by subjecting it to attrition in a mill, or to a high speed shearing action, or to the action of high pressures. Disintegration is generally carried out in the presence of a major amount by weight of a liquid medium, preferably water. Although tap water is the preferred liquid medium for the dispersion of fragmented starch hydrolysate, other liquids are suitable provided sufficient water is present to hydrate the fragmented starch hydrolysate and, thus, result in a dispersion having a suitable yield stress. Sugar solutions, polyols, of which glycerol is an example, alcohols, particularly ethanol, isopropanol, and the like, are good examples of suitable liquids that can be in admixture with water in the liquid medium. It may also be convenient to fragment the starch hydrolysate in a non-hydrating medium (e.g. 95% ethanol), then solvent exchange with water, and finally redisperse the fragmented starch hydrolysate to form an aqueous dispersion. Typically, however, the starch hydrolysate will be physically fragmented in potable water. Thus, this invention relates to a method of making an aqueous dispersion useful as a replacement for fats and/or oils comprising physically fragmenting a minor amount by weight of an amylopectin starch hydrolysate in the presence of a major amount by weight of a liquid consisting essentially of water, said physically fragmenting being effective to yield an aqueous dispersion having a yield stress of from about 100 pascals to about 1,500 pascals.

The mechanical disintegration is preferably accomplished by subjecting an aqueous dispersion of the hydrolysate to high shear, e.g. in a Waring blender or a homogenizer such as that disclosed in U.S. Pat. No. 4,533,254 (Cook et al.) and commercially available as a "MICROFLUIDIZER" from Microfluidics Corporation, Newton, Mass., or a homogenizer such as the RANNIE TM high pressure laboratory homogenizer, Model Mini-lab, type 8.30 H, APV Rannie, Minneapolis, Minn. Other suitable homogenizers include the model M3-10TBS from APV Gaulin, Arlington Heights, Ill. In general, the performance of homogenizers of the colloid mill type is improved by using a relatively low flow rate with backpressure with temperature at 55°-65° C. Other suitable devices, which provide mechanical shear, include continuous mixers, e.g. model 4M1H15A, from E. T. Oakes Corp., Islip, N.Y., and batch mixers, e.g. Breddo Likiwifier model LORWWSS-200, from American Ingredients, Kansas City, Mo.

The temperature of the starch hydrolysate must be maintained below the gelatinization (i.e. solubilization) temperature of the hydrolysate. Thus, it may be necessary to cool the hydrolysate during disintegration. For example, when shearing starch hydrolysate derived from waxy maize starch, the temperature of the aqueous dispersion is typically maintained between about 55° C. and about 65° C. Whatever method is used, the disintegration is carried out to such an extent that the resulting finely-divided product is characterized by its ability to form a salve-like suspension in the liquid medium in which it is attrited or in which it is subsequently dispersed. By a salve-like suspension or dispersion is meant one which will exhibit, at about 20% hydrolysate solids, a yield stress of at least about 100 pascals, typically from about 100 pascals to about 2,000 pascals.

It should be noted that it has been found that an aqueous dispersion of the hydrolysate generally exhibits an increase in viscosity over a period of hours following the mechanical disintegration. Thus, the yield stress values herein denote the yield stress about three hours after mechanical disintegration unless otherwise noted. It should also be noted that mechanical disintegration may be sufficient to produce an aqueous dispersion having the desired yield stress, but still leave a sufficient number of particles of sufficient size to exhibit a "particulate" or "chalky" mouthfeel when ingested. Such chalkiness can be reduced by reducing the particle size of the starch hydrolysate before, during or after mechanical disintegration so that substantially all (typically at least about 95%, preferably at least 99%) of the hydrolysate will pass a U.S. #400 mesh sieve (i.e. substantially all particles are less than 15 microns). An example of a milling device suitable for such size reduction is a TROST TM Air Impact Mill from Gatlock, Inc., Newton, Pa.

It has further been found that the use of a homogenizer as disclosed in U.S. Pat. No. 4,533,254 is facilitated by the addition of a small amount (e.g. 5% by weight of the starch hydrolysate dry solids) of an emulsifier to the aqueous slurry of starch hydrolysate fed to the homogenizer. When relatively high solids slurries of starch hydrolysate are fed into the homogenizer without added emulsifier, the homogenizer tends to plug after extended operation. The addition of emulsifier (for example, a mixture of mono- and di-fatty acid glycerides, e.g. DUR-LO TM emulsifier from Van den Bergh Foods) prevents this plugging of the homogenizer. Other emulsifiers include polyglycerol esters, polysorbates, ethoxylated monoglycerides, sorbitan monostearate, lactylated esters, and lecithin. Homogenizers useful in forming suspensions or emulsions are described generally by H. Reuter, "Homogenization", *Encyclopedia of Food Science*, pp. 374–376, (M. S. Peterson and A. H. Johnson, eds., AVI Publ. Co., Westport, Conn., 1978), L. H. Rees and W. D. Pandolfe, "Homogenizers", *Encyclopedia of Food Engineering*, pp. 467–472 (C. W. Flail et al., eds., AVI Publ. Co., Westport, Conn., 1986), and W. C. Griffin, "Emulsions", *Encyclopedia of Chemical Technology*, Vol. 8, pp. 900–930 (Kirk-Othmer eds., John Wiley & Sons, New York, N.Y., 3d ed., 1979), the disclosures of which are incorporated herein by reference.

in certain embodiments, this invention relates to a food formulation having a reduced level of fat and/or oil comprising a mixture of a foodstuff and a fragmented, amylopectin starch hydrolysate as a replacement for at least a substantial portion of the fat and/or oil of said food formulation, said hydrolysate being capable of forming an aqueous dispersion at about 20% hydrolysate solids exhibiting a yield stress of from about 100 to about 1,500 pascals.

In certain embodiments, this invention relates to a method of formulating a food containing a fat and/or oil ingredient comprising replacing at least a substantial portion of said fat and/or oil ingredient with a fragmented, amylopectin starch hydrolysate capable of forming an aqueous dispersion at about 20% hydrolysate solids exhibiting a yield stress of from about 100 to about 1,500 pascals.

By "fragmented, amylopectin starch hydrolysate" is meant a starch material comprised of a major proportion of amylopectin which has been subjected to acid hydrolysis followed by mechanical disintegration of the starch into fragments, a majority of which no longer exhibit the characteristic shape of the parent starch granule. The hydrolysis and disintegration will be sufficient to produce a hydrolysate which will form an aqueous dispersion at about 20% hydrolysate solids exhibiting a yield stress of from about 100 to about 1,500 pascals. The hydrolysis and fragmentation are accomplished at temperatures insufficient to gelatinize (or cook) said starch, and thus the fragments are composed predominantly of insoluble starch hydrolysate products.

The terms "foodstuff" and "food", as used herein, are intended to broadly cover nutritional and/or functional materials that are ingested by humans in the course of consuming edible fare. The term "fats and/or oils" is intended to broadly cover edible lipids in general, specifically the fatty triglycerides commonly found in foods. The terms thus include solid fats, plastic shortenings, fluid oils, and the like. Common fatty triglycerides include cottonseed oil, soybean oil, corn oil, peanut oil, canola oil, sesame oil, palm oil, palm kernel oil, menhaden oil, whale oil, lard, and tallow. The technology of fats and/or oils is described generally by T. H. Applewhite, "Fats and Fatty Oils", *Encyclopedia of Chemical Technology*, Vol. 9, pp. 795–831 (Kirk-Othmer, eds., John Wiley & Sons, New York, N.Y., 3d ed., 1980), the disclosure of which is incorporated by reference.

The use of the fragmented, amylopectin starch hydrolysate allows for the replacement of a substantial portion (e.g. from 10% to 100% by weight) of the fat and/or oil in a food formulation. The precise level of replacement that is possible without significantly decreasing the organoleptic quality of the food will generally vary with the type of food. For example, in a ground beef patty (e.g. standardized at 20% to 30% fat), it is generally possible to produce a patty having acceptable organoleptic properties, but having only 5–10% fat. In other types of meat products, e.g. frankfurters at about 30% fat by weight, about 50% to about 80% can be replaced with little effect on the organoleptic desirability of the product. Examples of typical meat products in which fat and/or oil can be replaced include ground and formed products (e.g. patties, luncheon meats) and emulsified and formed products (e.g. frankfurters, bologna). The amount of aqueous dispersion of fragmented starch hydrolysate used to replace fat will, in general, be less than the amount of fat replaced. In general, the ratio of meat to aqueous dispersion (at 25% starch hydrolysate solids) will range from about 100:1 to about 4:1, more typically from about 50:1 to about 6:1.

In another aspect, this invention relates to a method of formulating a food containing a fat and/or oil ingredient and replacing at least a substantial portion of said fat and/or oil ingredient with a fragmented granular, amylopectin starch hydrolysate, said hydrolysate being comprised of a major amount of cold-water insoluble hydrolysate and a minor amount of cold-water soluble hydrolysate.

In a related aspect, this invention relates to a food formulation having a reduced level of fat and/or oil comprising a mixture of a foodstuff and a fragmented granular, amylopectin starch hydrolysate, said hydrolysate being comprised of a major amount of cold-water insoluble hydrolysate and a minor amount of cold-water soluble hydrolysate, as a replacement for at least a substantial portion of the fat and/or oil of said food formulation.

Generally, it will be desirable to remove sufficient fat from a given food formulation to achieve a reduction in calories of at least one-third per customary serving or make a label claim of "cholesterol-free". (In this regard, see, for example, the list of standard serving sizes for various foods published in Food Labelling; Serving Sizes, 55 Fed. Reg. 29517 (1990) (to be codified at 21 C.F.R. 101.12), the disclosure of which is incorporated herein by reference, and the restrictions on labelling "cholesterol-free" at Food Labelling; Definitions of the Terms Cholesterol Free, Low Cholesterol and Reduced Cholesterol, 55 Fed. Reg. 29456 (1990)). It should also be noted that the fat removed from a particular formulation may be replaced with an equal amount by weight of an aqueous dispersion of fragmented starch hydrolysate, but that such equality may not be necessary or desirable in all instances. Further, it may be desirable to remove fat and add another ingredient (e.g. a gum, polydextrose, a protein, etc.) along with the aqueous dispersion of starch hydrolysate.

This invention relates to processed meats into which are incorporated an aqueous dispersion of the fragmented granular starch hydrolysate described above. As discussed above, the granular starch hydrolysate can be fragmented in an aqueous medium and then mixed with a processed meat mixture prior to forming into a patty or molding into a sausage.

Meat processing to produce patties of molded sausages is described in "Meat Processing", *Encyclopedia of Food Engineering*, pp. 545–557 (AVI Publ. Co., Westport, Conn., 2d ed., 1986), the disclosure of which is incorporated herein by reference. Processing steps in the production of processed meats typically include, grinding to reduce the particle size of the meat, followed, in the case of ground meat patties, by mixing and then patty formation. In the case of molded sausage products, grinding is followed, in the case of coarse ground filled products, by mixing and stuffing into casings or reusable molds (e.g. metal molds). In the case of emulsion filled sausage products, the mixing step is preceded by chopping and emulsifying. Some processed meats, e.g. frankfurters, are further processed, e.g. cooked, by the manufacturer prior to distribution.

In preparing reduced fat processed meat articles within the scope of this invention, leaner cuts of meat are employed than the cuts that are conventionally used to prepare the product. The aqueous dispersion of fragmented granular starch hydrolysate is mixed with the ground cuts of leaner meat to produce a product having reduced fat compared to the conventional processed meat, but still having acceptable organoleptic characteristics.

In another aspect, this invention relates to a composition of matter comprising a foodstuff, a major amount of an aqueous liquid and a minor amount of a fragmented granular, amylopectin starch hydrolysate dispersed in said aqueous liquid, said hydrolysate being comprised of a major amount of cold-water insoluble hydrolysate and a minor amount of cold-water soluble hydrolysate.

It is believed that the cold-water soluble hydrolysate material improves both the high-temperature stability of the cold-water insoluble hydrolysate material in the aqueous dispersion and the water immobilization capability of such cold-water insoluble hydrolysate material, as compared to aqueous dispersion containing only cold-water insoluble material at the same level of cold-water insoluble material solids. As an amylopectin based material, the fragmented granular starch hydrolysate will exhibit a bimaximal profile of oligomers of varying degree of polymerization with (i) a maximum in proximity to a degree of polymerization of about 13, and (ii) a maximum in proximity to a degree of polymerization of about 26. (A profile of the oligomeric composition of a starch hydrolysate (the "oligomer profile") can be obtained by the method described by K. Koizumi, et al., "High-Performance Anion-Exchange Chromatography of Homogeneous D-Gluco-Oligosaccharides and -Polysaccharides (Polymerization Degree equal to or greater than 50) With Pulsed Amperometric Detection", *Journal of Chromatography*, 46, pp. 365–373 (1989), the disclosure of which is incorporated by reference herein.)

While this invention is generally directed to the replacement of fat and/or oil in a food formulation, it is of course within the contemplation of this invention that a fragmented granular amylopectin starch hydrolysate will be used in an entirely new formulation to which it contributes fat-like organoleptic qualities but is not, in the strictest sense, replacing a pre-existing fat or oil ingredient. Moreover, it is contemplated that the fragmented granular amylopectin starch hydrolysate will have utility as a thickener, bodying agent, or the like in foods that normally do not have a significant fat or oil component. Further, it is contemplated that the combined use of fragmented granular amylopectin starch with fragmented granular amylose starch (e.g. as a blend) may have certain advantages in many of the compositions described herein. For example, the amylopectin based material may promote a unique consistency while the amylose based material provides greater heat stability to the blend.

In general, the fragmented granular starch hydrolysate is incorporated into the food as an aqueous dispersion, typically comprised of a major amount (i.e. greater than 50% by weight) of water or other liquid medium and a minor amount (i.e. less than 50% by weight, typically 10% to 40%) of starch hydrolysate solids. Thus, this invention relates to an aqueous dispersion useful as a replacement for fats and/or oils comprising a major amount by weight of water and a minor amount by weight of a fragmented granular starch hydrolysate, said fragmented granular starch hydrolysate being capable of imparting to said dispersion at about 20% solids a yield stress of from about 100 to about 1,500 pascals. Alternatively, the isolated hydrolysis product can be mixed with the food along with water and then subjected to disintegration in those instances when the other ingredients of the food are capable of withstanding the condition of disintegration, e.g. an emulsified meat. This latter alternative procedure is less preferred because the shear provided during emulsification may be insufficient to produce full fragmentation of the hydrolysis product. However, the partially fragmented starch hydrolysate has limited functionality that is useful in particular applications, i.e. the partially fragmented starch hydrolysate can bind water and/or modify texture).

It is contemplated that commercial production and use may involve hydrolysis, mechanical disintegration, and drying (e.g. spray drying) of the fragmented starch hydrolysate to produce an item of commerce. This item of commerce will then be purchased by a food processor for use as an ingredient. To incorporate the dried, fragmented granular starch hydrolysate into a food product, it may be useful and/or necessary to further mechanically disintegrate the starch hydrolysate while dispersing it into the foodstuff in which it will be employed. However, the techniques employed for such mechanical disintegration should not need to be nearly as vigorous as the original mechanical disintegration prior to drying.

As noted above, the terms "food" and "foodstuffs" are intended broadly, as relating to both nutritional and/or functional food ingredients. It is contemplated that one or more food ingredients may be mixed with the aqueous dispersion of fragmented, amylopectin starch hydrolysate, or even dry mixed with the amylopectin starch hydrolysate prior to mechanical disintegration.

Among the food ingredients in the food formulations of this invention include flavors, thickeners (e.g. starches and hydrophilic colloids), nutrients (e.g. carbohydrates, proteins, lipids, etc.), antioxidants, antimicrobial agents, colors, fillers, spices, salts, flavor enhancers, and so on. Generally, the other components of the various types of processed meat formulations will be conventional, although precise amounts of individual components and the presence of some of the conventional components may well be unconventional in a given formulation.

Hydrophilic colloids can include natural gum material such as carrageenan, xanthan gum, gum tragacanth, locust bean gum, guar gum, algin, alginates, gelatin, Irish moss, pectin, gum arabic, gum ghatti, gum karaya and plant hemicelluloses, e.g. corn hull gum. Synthetic gums such as water-soluble salts of carboxymethyl cellulose can also be used. Starches, including modified food starches, can also be added to the formulation. Examples of suitable starches include corn, waxy maize, wheat, rice, potato, and tapioca starches.

The following examples will illustrate the invention and variations thereof within the scope and spirit of the invention will be apparent therefrom. All parts, percentages, ratios and the like are by weight throughout this specification and the appended claims, unless otherwise noted in context.

EXAMPLE 1

Low Fat Pork Sausage Patty

A low fat pork sausage patty was prepared as follows:

| Ingredients: | % Emulsion | % Coarse Ground | Total % |
|---|---|---|---|
| 87% Lean pork | 6.75 | 68.25 | 75.00 |
| Water | 2.00 | 12.85 | 14.85 |
| STELLAR ™ fat replacer creme (A.E. Staley Mfg. Co.) | 6.00 | | 6.00 |
| Spice (Foran FQ7092091) | | 2.20 | 2.20 |
| STA-SLIM ™ 171 starch (A.E. Staley Mfg. Co.) | | 1.00 | 1.00 |
| Salt | 0.25 | 0.50 | 0.75 |
| Lard flavor (Florasynth WL-21,837) | | 0.20 | 0.20 |
| Total | 15.00 | 85.00 | 100.00 |

Procedure

STELLAR Creme

1. Prepare STELLAR fat replacer creme per separate formula "Procedure for Production of Typical STELLAR Creme, NPST 1".

Emulsion

1. Under vacuum, chop lean meat, water and salt in bowl chopper to coarse paste.
2. Add STELLAR creme when paste temperature reaches 50° F. and chop under vacuum to temperature of 55° F.

Coarse Ground

1. Use meat grinder to coarse grind meat to ½ inch using 4 blades.
2. Mix coarse ground meat, spice, lard flavor, salt and ½ of water for 1 minute in meat blender.
3. Add STA-SLIM 171, emulsion and remaining water. Mix for 1 minute in meat blender.
4. Use meat grinder to grind entire meat mixture to 3/16 inch using 4 blades,

Patty Forming

1. Use meat stuffer to stuff meat mixture into poly casing of 3 inch diameter.
2. Freeze stuffed product in meat freezer overnight.
3. Thaw stuffed product to internal temperature of 10° F. in meat cooler. (1-2 hours in a 40° F. degree cooler.)
4. Use meat slicer to slice to 2 oz. portion (approximately ¼ inch thick).
5. Pack slices on waxed paper and store frozen.

EXAMPLE 2

Ground Beef Meat Patties

A low fat ground beef patty was prepared as follows:

| Ingredients: | Parts By Weight |
| --- | --- |
| Meat | 91.00 |
| (74.1% of 95% lean beef and | |
| 16.9% of 72.5% lean beef) | |
| Salt | 0.40 |
| STELLAR creme (25% solids) | 4.00 |
| STA-SLIM 171 starch | 1.00 |
| Tallow flavor, TF-55 (A. E. Staley Mfg. Co.) | 0.50 |
| Flavor, F&C 101658 | 0.25 |
| Water | 2.85 |
| Total | 100.00 |

Procedure

1. Coarse grind meat using ½ inch plate.
2. Mix coarse ground meat, salt, STELLAR creme, STA-SLIM 171, tallow flavor, flavorings and water for 2 minutes in a meat blender.
3. Regrind meat mixture to 3/16 or ⅜ inch.
4. Form into patties and freeze.
5. Cook on preheated griddle set at 325° F. for 3 minutes 1st side and 3 minutes 2nd side.

EXAMPLE 3

Low Fat Pork Sausage/Coarse Ground

A low fat pork sausage was prepared from coarse ground pork as follows:

| Meat Premix Ingredients: | Parts By Weight |
| --- | --- |
| Pork cushion meat | 3.60 |
| STELLAR creme | 3.20 |
| Ice/water | 1.07 |
| Salt | 0.13 |
| Total | 8.00 |

Procedure

1. Coarse grind to ½ inch all pork cushion meat. Coarse grind all 50/50 trim to ½ inch.
2. Add salt, ice water and STELLAR creme. Mix 4 minutes until tacky.
3. Alternatively, add salt and ice water. Mix 2 minutes until tacky. Add STELLAR creme. Mix 2 minutes. Add to coarse ground meat.

| Final Meat Batch Ingredients | Parts By Weight |
| --- | --- |
| ½ inch pork cushion meat | 3.71 |
| ½ inch 50/50 trim | 0.38 |
| Meat premix | 0.90 |
| Water | 0.77 |
| STA-SLIM 171 | 0.06 |
| Spice | 0.14 |
| Salt | 0.03 |
| Lard flavor | 0.01 |
| | 6.00 |

Procedure

1. Mix meats (not including meat premix), spice, salt and one half of water for 1 minute.
2. Add starch, meat premix, water and lard flavor. Mix for 1 minute.
3. To form into patties, stuff into poly casings (3½ inch diameter).
4. Freeze overnight.
5. Temper to 10° F. in 40° F. cooler.
6. Slice to 2 oz. thick.
7. Alternatively, stuff into natural casings to form links.

EXAMPLE 4

Low Fat Sausage

A low fat sausage was prepared as follows:

| | Parts By Weight |
| --- | --- |
| Meat Premix Ingredients | |
| Pork cushion meat | 6.75 |
| STELLAR creme | 6.00 |
| Ice | 2.00 |
| Salt | 0.25 |
| Total | 15.00 |
| Batching Formula Ingredients: | |
| Coarse ground pork cushion meat | 66.95 |
| Meat premix | 15.00 |
| Water | 14.10 |
| STA-SLIM 171 | 1.00 |
| Spice | 2.25 |
| Salt | 0.50 |
| Lard flavor | 0.20 |

| | Parts By Weight |
|---|---|
| Total | 100.00 |

Procedure

Meat Premix

1. Use ½ inch coarse ground,
2. Add salt and ice water. Mix 2 minutes until tacky.
3. Add STELLAR. Mix 2 minutes until tacky.
4. Add to meat mixture.

Meat Mixture

1. To meat, add salt, spice and one half of water. Mix 1 minute.
2. Add starch, meat premix, water and lard flavor. Mix for 1 minute.
3. Regrind meat mixture through 3/16 inch plate.
4. Form into patties or sausage links.

EXAMPLE 5

Low Fat Frankfurter

A low fat frankfurter can be prepared as follows:

| Ingredients | Parts By Weight |
|---|---|
| Pork shank | 5.766 |
| 50% Lean beef trim | 4.719 |
| 80% Lean pork trim | 34.512 |
| Bull meat | 9.753 |
| Cheek meat | 2.759 |
| STELLAR creme | 10.000 |
| Water | 28.775 |
| Salt | 1.978 |
| Dextrose | 0.853 |
| Spice blend | 0.409 |
| Sodium tripolyphosphate | 0.300 |
| Prague powder | 0.144 |
| Sodium erythorbate | 0.032 |
| Total | 100.000 |

Procedure

1. Grind meats through ½ inch plate.
2. Into ½ of the formula's water, dissolve in order the following ingredients: sodium tripolyphosphate, prague powder and sodium erythorbate.
3. Add to bowl chopper all meat ingredients, water with sodium tripolyphosphate, prague powder and sodium erythorbate dissolved in it, remaining water as ice and salt. Emulsify to a coarse paste.
4. Add remaining non-meat ingredients such as STELLAR creme, dextrose and spice blend, and then emulsify to a suitable texture.
5. Finish emulsifying in a microcut using a 1.0 mm head.
6. Stuff into a suitable non-edible cellulose casing.
7. Smoke in a meat smoke house with proper smoking/drying and cooking cycles to an internal temperature of 158° F.
8. Cool, peel and vacuum pack in a suitable package.

What is claimed:

1. An article of processed meat having reduced levels of fat comprising a ground meat patty having incorporated therein a minor amount of an aqueous dispersion of a fragmented granular starch hydrolysate comprised of a major amount of cold-water insoluble starch hydrolysate and a minor amount of cold-water soluble starch hydrolysate.

2. An article of claim 1 wherein the ratio of the major amount of cold-water insoluble starch hydrolysate to the minor amount of cold-water soluble starch hydrolysate is from about 3.0:1 to no greater than about 9:1.

3. An article of claim 1 wherein said granular starch hydrolysate has a weight average molecular weight of from about 4,000 to about 7,500 g/mol.

4. An article of claim 1 wherein said granular starch hydrolysate is derived from a starch having a major proportion of amylopectin.

5. An article of claim 1 wherein said granular starch hydrolysate will form an aqueous dispersion having a yield stress of from about 100 to about 1,500 pascals when fragmented in an aqueous medium at 20% starch hydrolysate solids.

6. An article of claim 1 further comprising a minor amount of a salt selected from the group consisting of alkali metal chlorides, alkali metal sulfates, alkaline earth metal chlorides, alkaline earth metal sulfates, and mixtures of two or more thereof and wherein said salt is present in an amount of at least about 0.1% by weight of said starch hydrolysate.

7. An article of claim 1 wherein the weight ratio of the ground meat of said ground meat patty to said aqueous dispersion of fragmented starch hydrolysate is from about 100:1 to about 4:1.

8. An article of claim 1 wherein said ground meat of said ground meat patty is derived solely from beef.

9. An article of claim 1 wherein said ground meat patty has a fat content of from about 5% to about 10% by weight.

10. An article of processed meat having reduced levels of fat comprising a ground meat patty having incorporated therein an aqueous dispersion of a fragmented granular starch hydrolysate having a weight average molecular weight of from about 4,000 to about 7,500 g/mol and comprised of a major amount of cold-water insoluble starch hydrolysate and a minor amount of cold-water soluble hydrolysate, the ratio of said major amount of cold-water insoluble starch hydrolysate to said minor amount of cold-water soluble starch hydrolysate being from about 3.0:1 to no greater than about 9:1, and wherein said granular starch hydrolysate will form an aqueous dispersion having a yield stress of from about 100 to about 1,500 pascals when fragmented in an aqueous medium at 20% starch hydrolysate solids, said aqueous dispersion further comprising a salt selected from the group consisting of alkali metal chlorides, alkali metal sulfates, alkaline earth metal chlorides, alkaline earth metal sulfates, and mixtures of two or more thereof, in an amount of at least about 0.1% by weight of said starch hydrolysate, and wherein the fat content of said article is from about 5% to about 10% by weight.

11. An article of processed meat having reduced levels of fat comprising a molded sausage product having incorporated therein a minor amount of an aqueous dispersion of a fragmented granular starch hydrolysate comprised of a major amount of cold-water insoluble starch hydrolysate and a minor amount of cold-water soluble starch hydrolysate.

12. An article of claim 11 wherein the ratio of the major amount of cold-water insoluble starch hydrolysate to the minor amount of cold-water soluble starch hydrolysate is from about 3.0:1 to no greater than about 9:1.

13. An article of claim 11 wherein said granular starch hydrolysate has a weight average molecular weight of from about 4,000 to about 7,500 g/mol.

14. An article of claim 11 wherein said granular starch hydrolysate is derived from a starch having a major proportion of amylopectin.

15. An article of claim 11 wherein said particle gel has a yield stress of from about 100 to about 1,500 pascals at 20% starch hydrolysate solids.

16. An article of claim 11 further comprising a minor amount of a salt selected from the group consisting of alkali metal chlorides, alkali metal sulfates, alkaline earth metal chlorides, alkaline earth metal sulfates, and mixtures of two or more thereof and wherein said salt is present in an amount of at least about 0.1% by weight of said starch hydrolysate.

17. An article of claim 11 wherein the weight ratio of the meat of said molded sausage product to said aqueous dispersion of fragmented starch hydrolysate is from about 100:1 to about 4:1.

18. An article of claim 11 wherein said meat of said molded sausage article is derived solely from a meat emulsion.

19. An article of claim 1 wherein said molded sausage meat patty has a fat content of from about 2.5% to about 15% by weight.

20. An article of processed meat having reduced levels of fat comprising a molded sausage product having incorporated therein an aqueous dispersion of a fragmented granular starch hydrolysate having a weight average molecular weight of from about 4,000 to about 7,500 g/mol and comprised of a major amount of cold-water insoluble starch hydrolysate and a minor amount of cold-water soluble hydrolysate, the ratio of said major amount of cold-water insoluble starch hydrolysate to said minor amount of cold-water soluble starch hydrolysate being from about 3.0:1 to no greater than about 9:1, and wherein said granular starch hydrolysate will form an aqueous dispersion having a yield stress of from about 100 to about 1,500 pascals when fragmented in an aqueous medium at 20% starch hydrolysate solids, said aqueous dispersion further comprising a salt selected from the group consisting of alkali metal chlorides, alkali metal sulfates, alkaline earth metal chlorides, alkaline earth metal sulfates, and mixtures of two or more thereof, in an amount of at least about 0.1% by weight of said starch hydrolysate, and wherein the fat content of said article is from about 2.5% to about 15% by weight.

* * * * *